United States Patent [19]
Church, deceased

[11] Patent Number: 5,097,707
[45] Date of Patent: Mar. 24, 1992

[54] ROTATION SENSOR

[75] Inventor: Peter D. Church, deceased, late of Harrow, England, by Elsie W. Church, legal representative

[73] Assignee: GEC-Marconi Limited, England

[21] Appl. No.: 571,625

[22] PCT Filed: Jan. 10, 1990

[86] PCT No.: PCT/GB90/00029
§ 371 Date: Sep. 5, 1990
§ 102(e) Date: Sep. 5, 1990

[87] PCT Pub. No.: WO90/08300
PCT Pub. Date: Jul. 26, 1990

[30] Foreign Application Priority Data
Jan. 18, 1989 [GB] United Kingdom ................. 8900574

[51] Int. Cl.$^5$ ............................................. G01P 9/00
[52] U.S. Cl. ................................................. 73/505
[58] Field of Search ............................... 73/505, 504

[56] References Cited
U.S. PATENT DOCUMENTS
3,307,409 3/1967 Newton ................................... 73/505
4,384,409 5/1983 Lao ......................................... 73/505

FOREIGN PATENT DOCUMENTS
0175508 3/1986 European Pat. Off. .
62-148812 7/1987 Japan .

Primary Examiner—John E. Chapman
Attorney, Agent, or Firm—Kirschstein, Ottinger, Israel & Schiffmiller

[57] ABSTRACT

A vibrating gyro operating on the principle of vibration waves traveling along a curved elastic surface transverse to the surface and being subjected to coriolis forces on rotation of the surface such as to shift the phase of the signal. The surface is provided by a spiral strip of metal having a vibration generator and detector at each end. Vibration waves are transmitted in both directions simultaneously and the phase difference between the received signals is determined. This gives a measure of the rotation rate. The gyro has great sensitivity and is particularly suited to gimballed systems. It therefore complements the vibrating gyro of U.K. Patent No. 2164749.

17 Claims, 2 Drawing Sheets

ROTATION SENSOR

BACKGROUND OF THE INVENTION

1. Field of the Invention

This invention relates to rotation sensors of the kind sometimes referred to as solid state or vibrational gyroscopes. These differ from conventional gyroscopes in having no movable components.

2. Description of Related Art

One such vibrational gyroscope is described in U.K. Patent No. 2164749 which employs a cylindrical shell with a radial skirt or flange. The shell is driven to vibrate by electrodes positioned on a piezo-electric material deposited on the flat base. Transverse acoustic bending waves are thus transmitted around the shell in opposite directions and a standing wave pattern is set up. Rotation of the shell in conjunction with the travelling bending wave produces a Coriolis force which displaces the vibration nodal pattern to an extent which is related to the rate of rotation.

Such a sensor is ideal for 'strap down' applications where movements are large and sudden. Relatively low sensitivity is therefore required but with considerable frequency response.

SUMMARY OF THE INVENTION

One object of the present invention is to provide a rotation sensor with greater sensitivity, albeit with lower frequency response. A particular application for such a high sensitivity device is in a stabilised gimbal mounted system where correction movements are likely to be small and slow.

According to the present invention, a rotation sensor comprises a strip of elastic material wrapped about an axis to form a coil, means for producing transverse acoustic waves in the strip travelling in each of two opposite directions around the strip and means responsive to the speed of wave transmission in the two directions to provide an output indicative of the rate of rotation of the coil about an axis aligned with or parallel to the coil axis.

The coil is preferably of spiral form.

There are preferably wave transmitting means coupled to the strip at spaced positions along the strip, and wave receiving means coupled to the strip at spaced positions along the strip. In particular there may be a transmitting means and a receiving means positioned at each end of the strip.

The sensor may include means responsive to the phase difference of signals received by the respective receiving means.

The strip may be mounted between plate members. It may also, or alternatively, have edge portions thicker than the central portion to maintain spacing of adjacent turns of the coil. The strip may comprise an active central portion supported by periodic sideways extensions. It may have a series of holes along each edge, the strip area between adjacent holes providing the sideways extensions.

The coil may comprise two coaxial spiral strips the inner ends of the two spirals being coupled together, wave transmitting means and wave receiving means being coupled to the outer ends of each of the two spiral strips. The inner ends of the spiral strips may be continuous each with the other by means of a helical section between the two spiral strips. The strip may be, at least at one end, divided across its width into sections, the transmitting means being coupled to a first of the sections and the receiving means being coupled to second and third sections, the divisions between the sections being such as to provide leakage paths from the first to the second and from the first to the third sections which leakage paths differ in path length by half a wavelength at the operating frequency so tending to suppress the locally transmitted signal in the receiver sections.

According to a further aspect of the invention, in a rotation sensor as aforesaid, the means for producing transverse acoustic waves may be adapted to operate in conjunction with the length of the strip in such manner as to produce a respective resonant frequency for each direction of the signal transmission, and means are provided for detecting the difference between the two resonant frequencies, this difference being representative of the rate of rotation of the coil.

The means for producing transverse acoustic waves may then comprise transmitting means at spaced positions along the strip.

The sensitivity and frequency response of any form of travelling wave gyro depends on the time the waves take to travel from the point of transmission to the point of reception. If the time is doubled, then approximately, the sensitivity is doubled and the frequency response is halved. In the above mentioned vibrating shell gyro the geometric path length is fixed (i.e. one circumference). The time of transmission can be increased by (a) sending the travelling waves round the path more times, e.g. as is done in the analogous fiber-optic gyro, and (b) by reducing the speed of the waves. This latter alternative implies reducing the resonant frequency of the gyro (i.e., in the case of the vibrating shell gyro, making the shell very thin) and increasing the dynamic magnification at resonance. Although possible, this approach would tend to give a device with poor stability.

BRIEF DESCRIPTION OF THE DRAWINGS

A rotation sensor of the vibrating gyro kind, and in accordance with the invention, will now be described, by way of example, with reference to the accompanying drawings, of which.

DETAILED DESCRIPTION OF THE PREFERRED EMBODIMENTS

Figure 1:
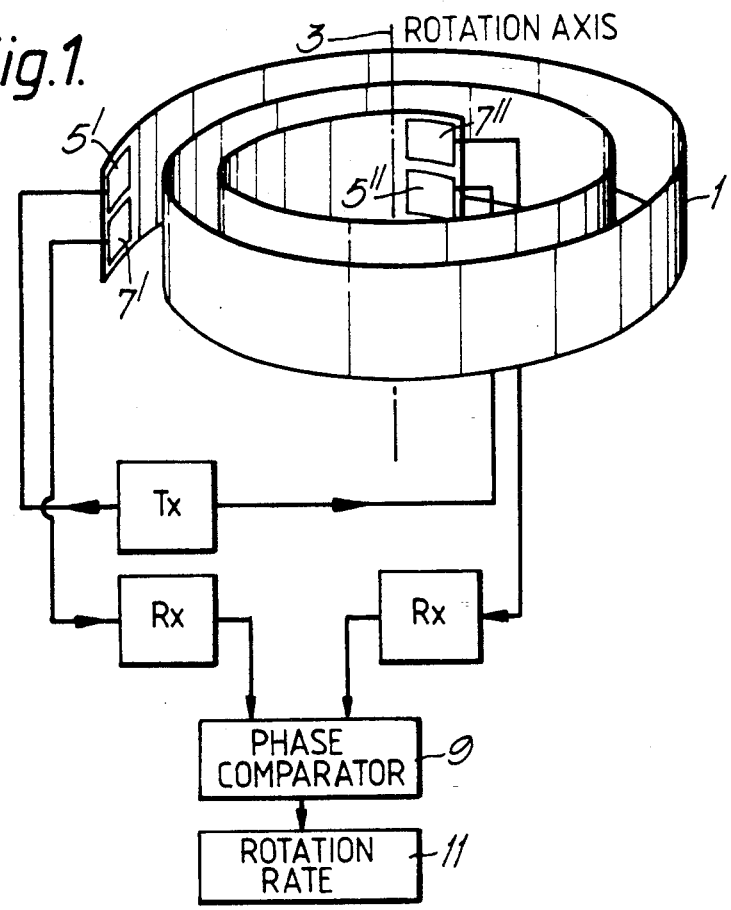
FIG. 1 is a perspective view of the vibrating gyro, comprising basically, a coiled strip of elastic material.

Referring to FIG. 1, a strip of metal foil 1, e.g. a low hysteresis material such as beryllium-copper alloy, is coiled into a spiral for compactness, the strip being wrapped, as it were, around an axis 3 with the individual turns spaced apart. Only a few turns are shown for simplicity, whereas in practice there would be some tens of turns at least.

At each end of the strip is a transmitting electrode assembly 5' and 5" and a receiving electrode assembly 7' and 7" shown merely as patches on the strip but in fact each comprising a layer of piezo-electric material and transverse strips of conductor. With a sufficiently thin foil, surface acoustic wave techniques can be used to produce waves utilising the full thickness of the foil.

The strip is mounted between two plates, not shown, the edges of the strip being glued to the plate with adhesive, or soldered in the case of metal plates. One method of achieving this design is to roll the strip with an interleaved strip of wax or other easily removable material acting as a spacer. Having wound the spiral, the edges of the metal strip are fixed to the plates and the wax is melted out. Alternative spacing materials may be dissolved out with suitable solvents.

An alternative spacing method is to etch away the central portion of the strip to a predetermined depth, leaving the edge portion of greater thickness. Rolling or wrapping the strip upon itself then still leaves a gap between the active portions of the strip.

Transverse acoustic vibrations are induced in the strip at each end synchronously by a common oscillator Tx in conjunction with the electrode assemblies 5' and 5". The induced vibrations are transverse to the strip surface and thus in the plane of the spiral. They may consist of bending waves, or shear waves if the wavelength is comparable to the strip thickness, or a combination of both.

In operation, transverse waves are transmitted along the strip in both directions in synchronism. The two vibration waves are received by the receiver electrode assemblies 7, converted thereby to electrical signals which are processed by the respective receivers Rx. The phases of the two signals are compared in a comparator 9 and the phase difference is converted to a rotation rate of the gyro by circuitry 11 which may display or issue the results as a control output. The rotation in question is of course that of the gyro about the axis 3 although a rotation about any other parallel axis is equivalent to rotation about the gyro axis and a translation which produces no signal.

The principle of operation of this gyro is the same as that of the vibrating shell gyro mentioned above. When the strip is rotating about the axis 3, transverse (i.e. radial) movement of each element of the strip produces a circumferential Coriolis force distribution. The effect of this is to increase the wave velocity in one direction around the strip and to decrease the wave velocity in the reverse direction. There results a continuing phase difference between the two received signals which is related to the angular velocity of the strip about the axis 3. This phase difference is detected and converted to rotation rate.

As described above, the mounting of the strip between two plates would tend to damp the transmitted waves considerably. The strip is therefore formed, as shown at each end of FIG. 3 (which will be described subsequently), with a series of holes 13 punched or etched along each edge. Thus the central, active, part of the strip 1 is suspended on the thin arms 17 formed between adjacent holes. If the suspension is not perfect, i.e. there is still some damping, the suspension arms 17 will load the central strip and cause weak reflections from the area of each arm attachment. This loss of energy can be reduced by resonant tuning of the suspension arms 17 at the frequency of the signal passing the ends of the arms. Such resonant tuning is effected by control of the length, width and thickness of the arms 17.

Figure 2:
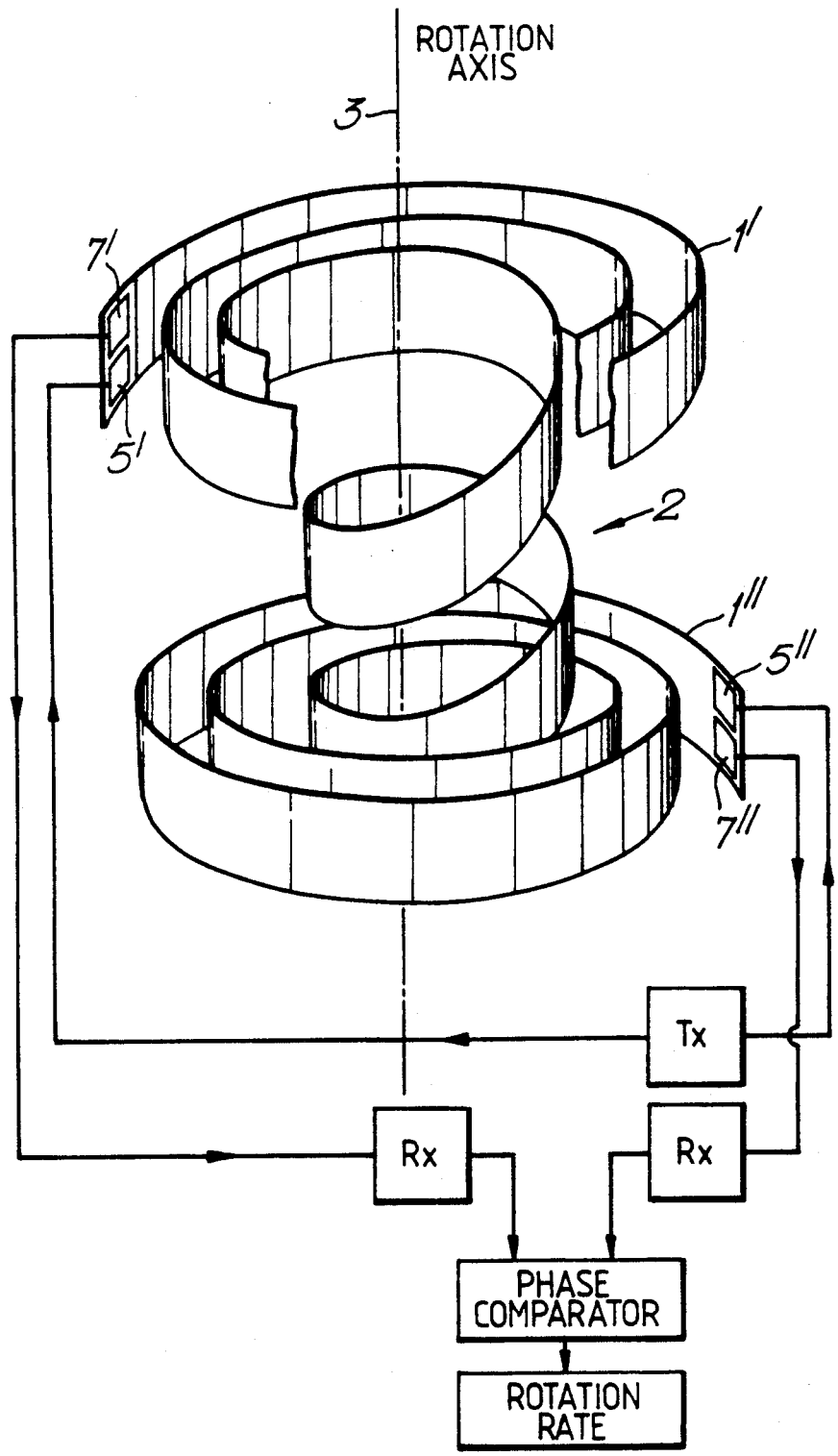
FIG. 2 is a similar diagram of a modification version employing, in effect, two strips.

The open ended strip 1, unlike the vibrating shell gyro above, is not restricted to a resonant circumferential length and may therefore be of considerable length, i.e. of many turns, in the interests of sensitivity. One way of achieving this which does not require a great number of turns in a single spiral, and which also has the advantage of providing both terminal electrode assemblies at the outside, is illustrated in FIG. 2. Here two spirals 1' and 1" are coupled to give twice the length of each. One spiral 1' is wound clockwise and the other 1", anticlockwise. The two spiral components are then coupled, in the case of the device shown in FIG. 2, by a short helical section 2 of the same strip. Clearly the two spiral components can be wound from a single strip 1.

In FIG. 2 the helical section is shown as nearly two turns but may be reduced to less than one turn if the two spiral sections 1' and 1" are mounted closer together. In this arrangement three mounting plates are employed, the middle one having a central hole for the helix to pass through.

The transmitter and receiver circuitry for this arrangement are the same as in FIG. 1.

Figure 3:
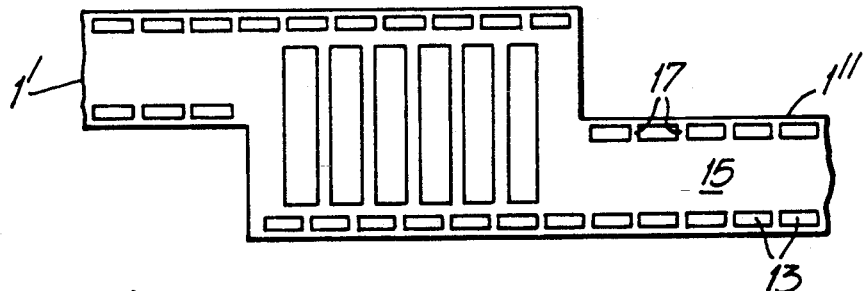
FIG. 3 is a diagram of an alternative coupling between the two strips.

As an alternative to the helical coupling of FIG. 2, a cross coupling as shown in FIG. 3 may be employed. In this case, the inner ends of the two spiral sections 1' and 1" are joined side by side as shown so that the two spirals are almost touching. They may in fact be continuous, being stamped or etched out of a single double-width strip. Transfer of the signals from one strip to the other is then effected by an electrode assembly 19 comprising conductive strips on a piezo-electric layer, this arrangement being well-known in surface acoustic wave technology.

In an alternative method of transferring the signal from one strip to the other the double width strip at the junction is angled to produce a mirror-like reflection from one strip to the other. Some loading of the angled edge may be necessary.

Figure 4:
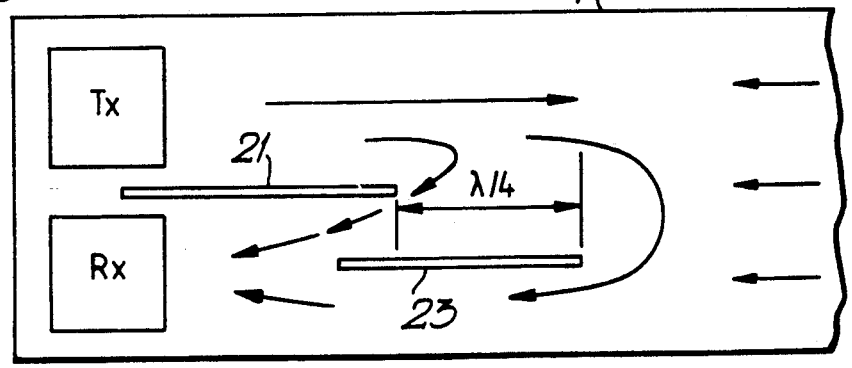
FIG. 4 is a diagram of a strip termination modification.

At each end of the strip, in any of the above embodiments there will be a leakage of the locally transmitted wave back to the receiver assembly. This leakage signal can cause confusion in reception of the required signal and degrade the phase measurement. FIG. 4 shows a modification which tends to suppress the unwanted leakage signal. A thin slot 21 is formed part-way across the strip commencing close to the electrode assemblies Tx and Rx thus preventing immediately local leakage. A further slot 23 is formed part-way across the receiver area and of length such as to commence just short of the end of the slot 21 and to extend beyond the slot 21 by a quarter-wavelength of the transmitted wave.

The effect of the slot arrangement is that the locally transmitted wave leaks around the end of the slot 21 and also around the end of the slot 23. Since the path length for these two signals differs by a half-wavelength they will tend to cancel on combining for reception by the receiver Rx. Cancellation can be optimised by adjusting the path widths.

It will be apparent of course that complete isolation could be obtained by completely separating the 'go' and 'return' paths, i.e. by using two quite separate strips. However, the advantage would be lost that any external influence such as temperature in a single strip scheme is imposed upon both the 'go' and the 'return' signal. The effect of the external influence is thus self-cancelling to a large extent. Separate strips would permit differential temperature effects and an indeterminate offset.

In a further variation the strip (or strips) may be wound in a completely helical arrangement, the essential feature being that a line normal to the strip surface at any point has at least a radial component. This is achieved by any coiling arrangement in which the strip can be said to be wrapped around the axis 3. It will be apparent, of course, that the spiral arrangement produces the most compact design.

While in the above arrangements piezo-electric effects are employed in the electrode assemblies, it will be appreciated that any other source and detector of vibration waves may be used, e.g. electro-magnetic transducers. While piezo-electric electrode assemblies provide a very compact geometry, for maximum sensitivity a high amplitude drive is needed thus enabling a greater strip length to be used. Such high amplitude drive may be provided by an electromagnetic transducer.

In a modification of the above device, a resonant system may be set up by relating the length of the strip to the frequency of operation in such manner that the strip length is an integral number of wavelengths. Rotation about the axis now causes an offset in the resonant frequency, a decrease in the forward direction and an increase in the reverse direction. The frequency differential is then a measure of the rotation rate and may be measured by a transducer coupled to the strip to detect the beat frequency or a frequency discriminator coupled to receiving means at opposite ends of the strip.

In a further variation the transmitting and receiving means may be located at one end only, the other end having a good reflecting termination. Again the strip length is related to the operating frequency to provide a resonant system and the beat frequency is detected as above by a transducer coupled to the strip and providing an output related to the rotation rate.

I claim:

1. A rotation sensor comprising a strip of elastic material said strip being wrapped about an axis to form a coil, means for transmitting transverse bending/shear waves around the strip in each of two directions and means responsive to the speed of wave transmission in the two directions to provide an output indicative of the rate of rotation of the coil about an axis aligned with or parallel to said axis.

2. A rotation sensor according to claim 1, wherein said coil is of spiral form.

3. A rotation sensor according to claim 2, including wave transmitting means coupled to the strip at spaced positions along the strip, and wave receiving means coupled to the strip at spaced positions.

4. A rotation sensor according to claim 3, wherein a said transmitting means and a said receiving means are positioned at both ends of the strip.

5. A rotation sensor according to claim 4, including means responsive to the phase difference of signals received by the respective receiving means.

6. A rotation sensor according to claim 2, wherein said strip is mounted between plate members.

7. A rotation sensor according to claim 2, wherein the strip has edge portions thicker than the central portion to maintain spacing of adjacent turns of the coil.

8. A rotation sensor according to claim 7, wherein the thinner central portion is formed by etching.

9. A rotation sensor according to claim 2, wherein said strip comprises an active central portion supported by periodic sideways extensions.

10. A rotation sensor according to claim 9, wherein said strip has a series of holes along each edge, the strip area between adjacent holes providing said sideways extensions.

11. A rotation sensor according to claim 1, wherein said coil comprises two coaxial spiral strips the inner ends of the two spirals being coupled together, wave transmitting means and wave receiving means being coupled to the outer ends of each of the two spiral strips.

12. A rotation sensor according to claim 11, wherein the inner ends of the spiral strips are continuous each with the other by means of a helical section between the two spiral strips.

13. A rotation sensor according to claim 4, wherein the strip is, at least at one end, divided across its width into sections, said transmitting means being coupled to a first of said sections and said receiving means being coupled to second and third said sections, the divisions between said sections being such as to provide leakage paths from said first to said second and from said first to said third sections which leakage paths differ in path length by half a wavelength at the operating frequency so tending to suppress the locally transmitted signal in the receiver sections.

14. A rotation sensor according to claim 1 wherein said means for producing transverse acoustic waves are adapted to operate in conjunction with the length of said strip in such manner as to produce a respective resonant frequency for each direction of the signal transmission, means being provided for detecting the difference between the two resonant frequencies, said difference being representative of said rate of rotation of said coil.

15. A rotation sensor according to claim 14, wherein said means for producing transverse acoustic waves comprise transmitting means at spaced positions along said strip.

16. A rotation sensor according to claim 11, wherein the strip is, at least at one end, divided across its width into sections, said transmitting means being coupled to a first of said sections and said receiving means being coupled to second and third said sections, the divisions between said sections being such as to provide leakage paths from said first to said second and from said first to said third sections which leakage paths differ in path length by half a wavelength at the operating frequency so tending to suppress the locally transmitted signal in the receiver sections.

17. A rotation sensor according to claim 2 wherein said means for producing transverse acoustic waves are adapted to operate in conjunction with the length of said strip in such manner as to produce a respective resonant frequency for each direction of the signal transmission, means being provided for detecting the difference between the two resonant frequencies, said difference being representative of said rate of rotation of said coil.

* * * * *

UNITED STATES PATENT AND TRADEMARK OFFICE
CERTIFICATE OF CORRECTION

PATENT NO. : 5,097,707
DATED : March 24, 1992
INVENTOR(S) : Peter D. Church, deceased It is certified that error appears in the above-indentified patent and that said Letters Patent is hereby corrected as shown below:

On the title page Item [30]: Foreign Application Priority Data change "Jan. 18, 1989" to --Jan. 11, 1989--.

Signed and Sealed this

Twelfth Day of October, 1993

*Attest:*

BRUCE LEHMAN

*Attesting Officer*    *Commissioner of Patents and Trademarks*